W. R. Clark,
Corn Planter,
Nº 78,262.      Patented May 26, 1868.
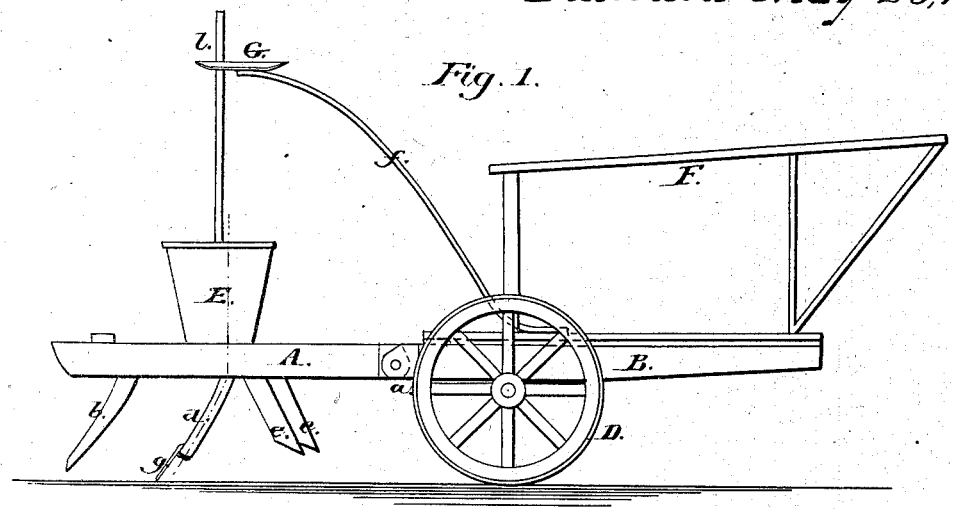
Fig. 1.
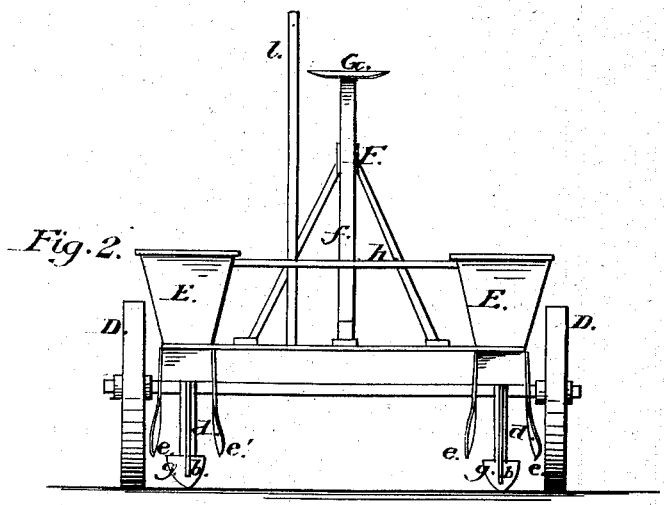
Fig. 2.
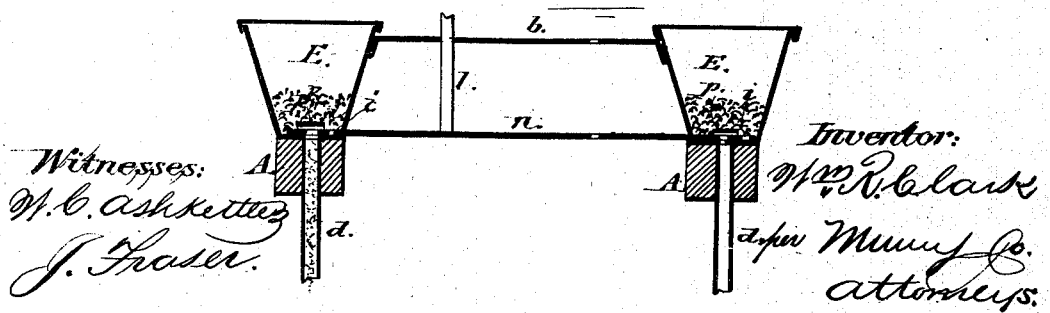
Witnesses:
W. C. Ashketter
J. Fraser
Inventor:
Wm. R. Clark
per Munn & Co.
Attorneys

United States Patent Office.

WILLIAM R. CLARK, OF INDIANOLA, ILLINOIS.

*Letters Patent No. 78,262, dated May 26, 1868.*

---

IMPROVEMENT IN CORN-PLANTERS.

---

*The Schedule referred to in these Letters Patent and making part of the same.*

---

TO ALL WHOM IT MAY CONCERN:

Be it known that I, WILLIAM R. CLARK, of Indianola, in the county of Vermillion, and State of Illinois, have invented new and useful Improvements in Corn-Planters; and I do hereby declare that the following is a full, clear, and exact description thereof, which will enable those skilled in the art to make and use the same, reference being had to the accompanying drawings, forming part of this specification, in which—

Figure 1 is a side view of my improved corn-planter.

Figure 2 is a front view of the same.

Figure 3 is a cross-section of the hoppers.

Similar letters of reference indicate corresponding parts.

This invention consists in certain devices, which conduce to a more perfect and satisfactory operation in planting corn, or other grain of equivalent character, as will be hereinafter more fully set forth.

In the accompanying plate of drawings—

A and B are the two general frames of the machine, which are pivoted or hinged together, as shown at $a$, any suitable hinge-joint being used therefor.

The object of thus hinging the two parts is to provide a yielding quality or action to both parts, but more particularly to the part A, which bears the ploughs, so that the ploughs shall work with a more equable and uniform effect when used in uneven soil or across old furrows, or in soil that is both of a hard and loose or variable character.

The part A is provided with seed-hoppers E and planting-tubes $d$, which conduct the seed from the hoppers to the furrows.

These planting-tubes also furnish the point of attachment of the furrow-ploughs $g$, the said ploughs being bolted or otherwise firmly affixed to the front of the tubes, as shown, so that the corn or seed shall be deposited immediately at and behind the said ploughs, in which case the said corn or seed is partially covered by the loose, mellow soil, as it falls back into the furrow as the ploughs pass forward.

Heretofore, the corn planted by machines was covered in by one or more ploughs, each of which cut positive and separate furrows, thereby increasing the draught of the machine, and covering in the corn with heavy clods of unmellowed soil, and too deeply for good results.

In these machines the wheels also followed upon the covered furrow, and pressed down the soil.

I obviate these above-cited objections by covering in the planted corn by means of wing-scrapers $e\ e'$, which are affixed to the frame A, and are simply plate-metal wings, with their edges presented so as to scrape the mellowed or loose soil within and along the sides of the furrows made by the ploughs $g$, whereby the pulverized soil of the furrow is used to cover in the planted corn, and, when so covered in, the furrow is merely filled with a low ridge of loose earth, and not heaped up in the common manner, which manner is more or less objectionable.

The outer scrapers $e$ are set a little in advance of the inner scrapers, as shown, for the purpose of preventing the space between the scrapers from choking up.

The front edges are slightly flared, as shown, for the purpose of enabling them to scrape out the sides of the furrow and deposit the soil centrally upon the planted corn.

They are also inclined backwards, to conduce to that result.

The lower ends of the planting-tubes $d$ are, in practice, made flaring or bell-shaped, for the purpose of preventing them from being choked up by the soil.

The ridge of soil which covers the planted corn, not rising above the sides of the furrow, it cannot be pressed down by the wheels D, which are outside of the furrow, as shown.

$b\ b$ are cutters, immediately in front of the ploughs, for the purpose of cutting through any sods or top-growth, and thereby enabling the ploughs to make a clear, open furrow.

G is the seat, which is supported by a spring, $f$, rising from the part B.

This seat is for the dropper, who works the lever $l$, which causes the deposit of the corn, as will be shown.

F is a seat-board for the driver, and enables him to shift his position until his weight balances the machine in a satisfactory manner.

The mechanism for dropping the corn will now be described, by reference to fig. 3.

The lever $l$ is pivoted in the cross-bar $h$, connecting the hoppers, as shown, and also attached, by any suitable loose joint, to the bar $n$, the ends of which enter the hoppers, as shown, the said ends passing over the upper ends of the planting-tubes $d$, and under the guard-plate $p$.

Two holes are made in the bar $n$, near each end.

One of these holes is shown at $i$, and the other may be seen coinciding with the bore of the planting-tubes $d$.

This bar is permitted a short lateral motion, sufficient to bring the two holes at each end alternately over their respective planting-tube, whereby, at each vibration of the lever $l$, the said holes are brought alternately over the tube.

The corn being in the hopper, above the bar $n$, one or more grains will be forced into the holes $i$, when it passes down under the guard $p$, and when the filled hole comes over the planting-tube, the said grain or grains will fall into the tube, and be discharged from its lower end into the furrow.

Thus, by vibrating the lever $l$, the grain will be dropped regularly into the furrow, behind the ploughs $g$, in the manner before stated.

This invention is simple, and of small cost, and operates in a satisfactory manner.

I claim as new, and desire to secure by Letters Patent—

The hinged frame A and B, with the seats G and F upon one part, and the ploughs and hoppers upon the other, substantially as shown and described, and for the purpose specified.

WILLIAM R. CLARK.

Witnesses:
    ISAAC FISHER,
    G. N. BAUM.